United States Patent [19]

Freeman et al.

[11] 3,763,474

[45] Oct. 2, 1973

[54] PROGRAM ACTIVATED COMPUTER DIAGNOSTIC SYSTEM

[75] Inventors: Richard Don Freeman, Madison; Lawrence John Loporcaro, Rockaway Township, Morris County, both of N.J.

[73] Assignee: Bell Telephone Laboratories, Incorporated, Murray Hill, Berkeley Heights, N.J.

[22] Filed: Dec. 9, 1971

[21] Appl. No.: 206,276

[52] U.S. Cl. ........................ 340/172.5, 235/153 AC

[51] Int. Cl. ............................................ G06f 11/04

[58] Field of Search .................. 340/172.5; 235/157, 235/153

[56] References Cited

UNITED STATES PATENTS

| | | | |
|---|---|---|---|
| 3,518,413 | 6/1970 | Holtey | 235/153 |
| 3,496,551 | 2/1970 | Driscoll et al. | 340/172.5 |
| 3,312,951 | 4/1967 | Hertz | 340/172.5 |
| 3,415,981 | 12/1968 | Smith et al. | 235/153 |
| 3,213,427 | 10/1965 | Schmitt | 340/172.5 |
| 3,343,141 | 9/1967 | Hackl | 340/172.5 |
| 3,540,003 | 11/1970 | Murphy | 340/172.5 |

*Primary Examiner*—Paul J. Henon
*Assistant Examiner*—Mark Edward Nusbaum
*Attorney*—W. L. Keefauver

[57] ABSTRACT

A hardware diagnostic system is utilized to gather data on the real-time operation of software programs in a multiprocessor computer system. The system is activated by request instructions planted in the processor's programs at those locations which the programmer wishes to monitor. Upon detecting one of the request instructions, the system acts essentially independent of processor control to gather information concerning when and which processor acted upon the request instruction. The processing system continues its data processing while the diagnostic system handles the monitoring request.

1 Claim, 3 Drawing Figures

Patented Oct. 2, 1973 3,763,474

3 Sheets-Sheet 1

Patented Oct. 2, 1973 3,763,474

3 Sheets-Sheet 3

PROGRAM ACTIVATED COMPUTER DIAGNOSTIC SYSTEM

GOVERNMENT CONTRACTS

The invention herein claimed was made in the course of or under a contract with the Department of the Army.

FIELD OF THE INVENTION

This invention is concerned with a data processing system and, more specifically, with a system for obtaining diagnostic information on the real-time usage of program instructions by one or more processing units.

BACKGROUND OF THE INVENTION

Hardware monitors have been used to obtain diagnostic data on the performance of hardware devices in various data processing systems. In such systems, a plurality of probes are connected to certain vital points in the system, such as strategic registers, triggers in a central processing unit, and lines to input-output devices. The activity of each of these points is monitored and the information obtained is categorized by counters and plotters. This technique is useful for obtaining averages of specific usage of hardware and often indicates the more prevalent performance problems in the system. However, as the complexity of data processing systems increases, due to the implementation of such techniques as multiprogramming, multipath I/0, dynamic address translation, and time slicing, hardware monitors have been found to be incapable of generating the type of precise information needed to evaluate the specifics of the hardware-software interaction within the system. When analyzed by a hardware monitor, a system often appears to be functioning well. However, upon closer evaluation of instruction usage, a severe degradation in system performance is indicated. Often no one even suspected that the inefficiency was present.

It is often also desirable to monitor the performance of software program instructions used in a data processing system. Reliable information on the hardware usage of the instructions is needed in order to determine if all system resources including both hardware and software are being used efficiently. Diagnostic criterion, such as for example, event tracing, analysis of system failures, program utilization, queuing and optimization of coding can be deduced from instruction usage information. Without this information, what is actually taking place in the system is obscure.

Software techniques, in addition to hardware monitors, have also been used to gather information on the performance of data processing systems. The two techniques, program simulation of system operation and benchmark program evaluation, are often used to analyze the operation of hardware in the system. Similarly, software subroutines have been developed to obtain specific data directed toward optimizing software programs. However, a difficulty inherent in all software diagnostic aids is that the simultaneous running of the diagnostic aid with the program under evaluation interferes with the normal data flow and spurious results may result. Also, running a diagnostic program in conjunction with normal system programs may significantly reduce the processor's ability to function in its mission directed capacity. Often the reduction of processor usable real-time makes running of the software diagnostic program prohibitively expensive.

Thus, the engineer who wishes to analyze system performance is presented with two choices. He can employ a hardware monitor to obtain general information on hardware activities and not perturbate the system. Or he can employ a software program to obtain specific data at the cost of reducing processor real-time and potentially interfering with system operation. Furthermore, in analyzing the software results, the engineer must be cognizant that the results may depict an altered system.

It is an object of this invention to obtain diagnostic data on the real-time hardware usage of software programs while minimizing both the perturbation of normal data flow and the processor real-time devoted to gathering the diagnostic data.

It is a further object of this invention to obtain diagnostic data in response to request instructions placed in the processor's program at those locations where information on hardware utilization of the instructions is desired.

SUMMARY OF THE INVENTION

The present invention stems from the recognition that, by modification of a hardware monitor and by making its activation mechanism software responsive, the simplicity of the hardware monitor is retained while versatility of the software techniques is gained. It is through this recognition that the complexity of the data gathering apparatus is minimized without sacrificing processor real-time or interfering with system operation.

In accordance with one illustrative embodiment of the principles of this invention, an event correlator gathers diagnostic information on the real-time operation of software programs in a data processing system comprising one or more processing units. The event correlator is activated by request instructions planted in the processor's program at those locations which the programmer wishes to monitor. Each of the instructions acted upon by the processors is scanned; and when a request instruction is detected, the event correlator acts essentially independently of processor control to generate a diagnostic data word which describes when and which processor acted upon the request instruction. The processing system continues its data processing while the diagnostic device handles the monitoring request.

To form a diagnostic data word, the event correlator combines data within the request instruction with other pertinent information indicating the status of the hardware when the instruction was executed. Typically, the pertinent information would specify the system time and which processor executed the instruction. The data within the request instruction is preprogrammed, and may specify, inter alia, the name of the program which executed the instruction, and the time a given input from a hardware device was received.

The event correlator assigns the diagnostic data word the next address in a buffer reserved for storing diagnostic information, and a memory controller stores the data word in the new address in memory. When the event correlator ascertains that a given portion of the buffer is full, it signals an input/output controller to output the diagnostic information stored in that portion of the buffer.

In accordance with a feature of this invention, information on the specific usage of software instructions by hardware devices is obtained essentially independent of processor control, thereby minimizing the perturbation of system operation.

GENERAL DESCRIPTION

Figure 1:
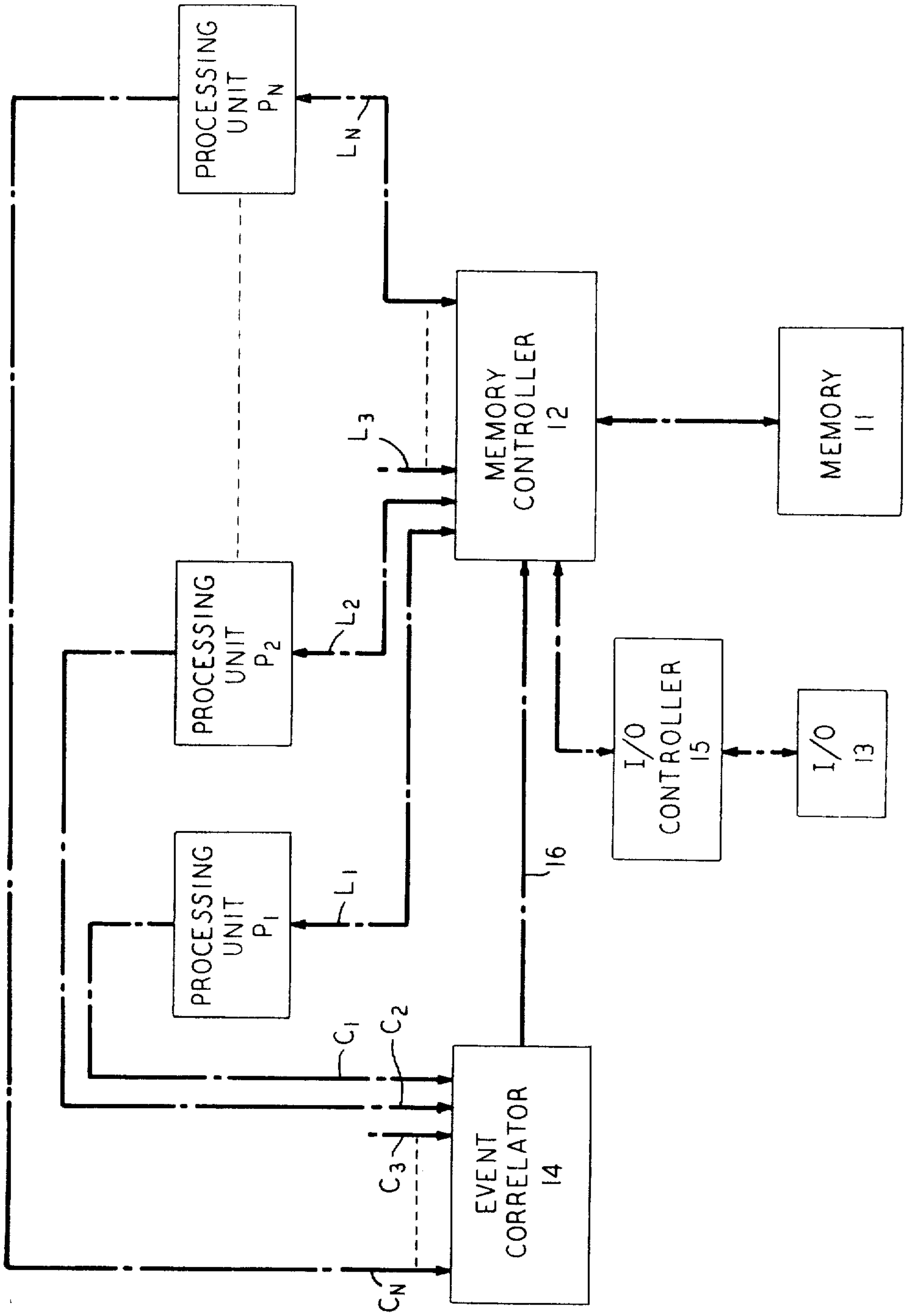
FIG. 1 is a simplified block diagram showing an illustrative event correlator and its adaptation into a multiprocessing system in accordance with the principles of this invention.

FIG. 1 is a block diagram showing a typical multiprocessing system and associated apparatus for gathering diagnostic data on the real-time usage of program instructions in accordance with the principles of this invention. Processing units $P_{1-n}$ are apparatus for performing logical, arithmetic, and input/output operations on data in accordance with stored instruction. The units successively receive instructions, decode them, and perform the operations indicated thereby. Such units are in wide use today in a multitude of capacities both technical and business oriented. One such unit is described in J. F. Couleur et al. U.S. Pat. No. 3,500,329, issued Mar. 10, 1970. Processing units $P_{1-n}$ may be arranged to handle, either in combination or individually, the functions of multiprogramming, time sharing, and batch processing among many other possible uses.

Each of the processing units $P_{1-n}$ autonomously performs the function specified by those program instructions and data which it itself decodes. The units interact by bidding for the use of system resources and altering the data base utilized by more than one unit. Since each unit may decode hundreds of thousands of program instructions each second, the number of computations and interactions is so great that the step-by-step hardware-software interaction is a great mystery. The system may appear to be running well since each of the processing units $P_{1-n}$ is performing its function; however, closer evaluation may indicate that a given unit with a low priority is spending a substantial amount of time waiting to access a program heavily used by the other units. Once the problem is recognized the solution is usually simple. For example, the priorities may be changed to prohibit discrimination against the unit, or a duplicate program may be added to avoid the congestion. This invention concerns an auxilary unit, event correlator 14, which gathers the specific information required to evaluate the performance of processing units $P_{1-n}$ in order to recognize many of the problems which may exist.

Memory capacity for the storage of data and/or instructions is provided by memory unit 11 which has discrete addressable memory locations each beneficially providing storage of one or more words. A suitable memory is disclosed in D. L. Bahrs et al. U.S. Pat. No. 3,413,613, issued Nov. 26, 1968.

Communication between the external world and the data processing system shown in FIG. 1 is obtained through input/output (I/O) unit 13. This unit in conjunction with I/O controller 15 handles bidirectional data transmission with the system. A similar I/O controller is disclosed and described in the above-mentioned D. L. Bahrs et al. patent. I/O unit 13 is an apparatus such as, for example, a magnetic tape handler, magnetic disk, graphic display or a remote terminal device. I/O controller 15, which serves as the interface between I/O unit 13 and the rest of the data processing system, contains buffer registers for temporarily storing data in transit between I/O unit 13 and memory controller 12. Typically, I/O controller 15 is a semi-autonomous device which controls communication between relatively slow I/O unit 13 and much faster processing units $P_{1-n}$.

By selectively accessing memory 11, in compliance with access requests received over cables $L_{1-n}$, memory controller 12 serves as the interface between processing units $P_{1-n}$ and memory 11. Memory controller 12 also coordinates the data flow between processing units $P_{1-n}$ and controls the priorities established to handle memory requests simultaneously received from processing units $P_{1-n}$. The link between I/O controller 15 and both memory 11 and processing units $P_{1-n}$ is established under the supervision of memory controller 12 which is programmed or logically wired to award priorities in certain circumstances to specific devices. Memory controller 12's main function is to coordinate the transfer of information between the devices in the system. Since the system devices normally operate at different speeds, memory controller 12 has buffers for storing information thus enabling each entity to function at its maximum speed without being burdened by the slower devices. For example, when processing unit $P_1$ requests storage of a quantity of data, memory controller 12 buffers the data received over cable $L_1$, initiates storage of the buffered data in the specified location(s) in memory 11 and then signals processing unit $P_1$ when the requested memory operation has been completed. Since memory controller 12 autonomously handles both storage and retrieval requests, processing units $P_{1-n}$ are able to do additional processing while their memory access requests are being processed.

Dependent upon the type of dynamic interaction which is required between processing units $P_{1-n}$ to perform their function, some of the processing units may access only designated areas of memory 11 while other units may access entire memory 11. Thus, a given processing unit may or may not have access to all the program instruction stored in memory 11.

In accordance with the principles of this invention, event correlator 14 is a hardware device, hereinafter described in regard to FIG. 3, which gathers and correlates specific data on the real-time usage of program instructions by processing units $P_{1-n}$. Event correlator 14 is an auxilliary monitoring device which may be added to an existing data processing system. Request instructions, which are dummy instructions whose function is to indicate to event correlator 14 that a monitoring request is desired, are placed in the programs used by processing units $P_{1-n}$ at those locations where diagnostic information is needed. When event correlator 14 detects over cables $C_{1-n}$ that one of the processing units $P_{1-n}$ is acting upon a request instruction, it realizes that a monitoring request is desired and handles the request independent of processor control. Thus, processing units $P_{1-n}$ are able to continue normal processing while event correlator 14 autonomously responds to the monitoring request.

Event correlator 14, in response to the request instruction, determines which of processing units $P_{1-n}$ acted upon the request instruction and the time the action was commenced. This information is combined with other information contained in the request instruction which for example may identify a program name, the time when a specified input signal from either a hardware or software source was received, the start or end of a specific program routine or portion thereof, or validity information identifying error paths within a routine. The combined information is assigned an address in memory 11 and conveyed to memory controller 12 via cable 16. Memory controller 12 then stores the information at the designated address. The information obtained is a precise record of the order and time at which the request instructions were utilized by processing units $P_{1-n}$. This record may be evaluated to give an exacting account of how a given program was utilized thereby shedding light on both the program itself and the hardware usage of the program.

DETAILED DESCRIPTION

Figure 2:
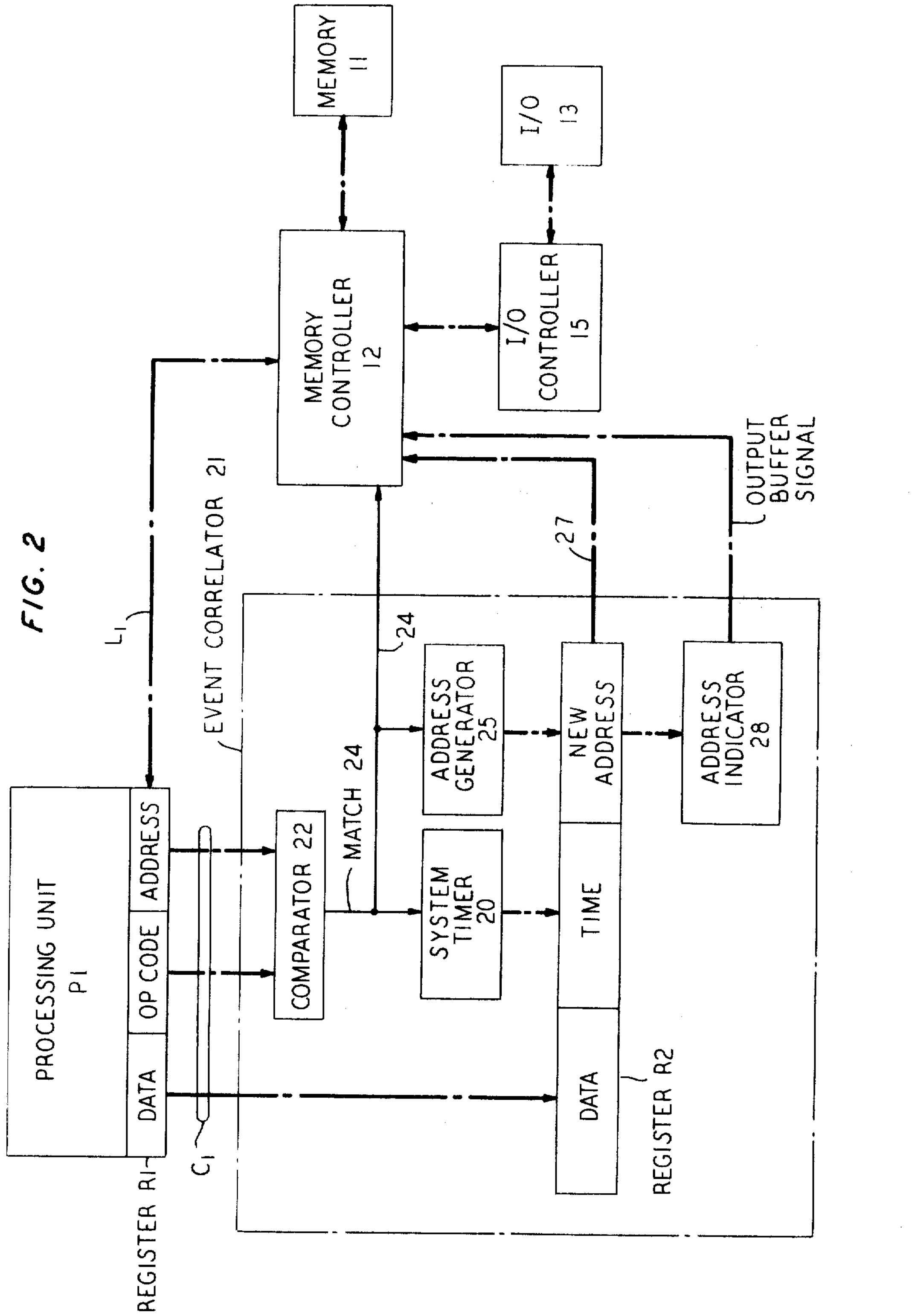
FIG. 2 is a block diagram of a data processing system in which an illustrative event correlator associated therewith is diagrammatically illustrated.

FIG. 2 is a block diagram showing, in accordance with the principles of this invention, the composite elements of an illustrative event correlator and their implementation in a data processing system. Processing unit $P_1$, memory controller 12, memory 11, I/O controller 15 and I/O unit 13, all shown in FIG. 2, each respectively corresponds to its numerically identical counterpart of FIG. 1.

Processing unit $P_1$ decodes each of the instructions successively accessed via cable $L_1$ from memory 11 and placed in register R1. In this illustrative example, each instruction, as depicted in register R1, comprises three information items: data, an op code which designates the type of operation that is to be performed (e.g., store, fetch, logical shift), and an address at which data is to be stored or from which it is to be retrieved.

Event correlator 21, when it determines that processing unit $P_1$ has executed a request instruction and, when a request instruction is identified, generates a diagnostic data word which contains information on the usage of the request instruction. The diagnostic data word is formed in register R2 and subsequently transmitted to memory controller 12 which stores the word. Processing unit $P_1$ after decoding a request instruction continues its processing by fetching the next program instruction.

More specifically, comparator 22 determines whether each of the instructions placed in register R1 is a request instruction. In this illustrative embodiment, comparator 22 monitors the op code and address of each of the instructions placed in register R1. If the op code and address of the monitored instruction match a predetermined op code and address identifying a request instruction, comparator 22 signals memory controller 12 via line 24 that a match has occurred. Memory controller 12, in response to the match signal, prepares to receive, over cable 27, a diagnostic data word from register R2. If the instruction in register R1 is not a request instruction, comparator 22 takes no other action, and processing unit $P_1$ and memory controller 12 continue their normal activities. Comparator 22 comprises a plurality of gate circuits of the type illustrated in FIG. 4–17 on page 71 of B. Wels' book entitled Computer Circuits and How They Work, published in October 1970 by Tab Books. Comparator 22 also includes a binary source for providing the predetermined op code and address identifying a request instruction.

It is realized that event correlator 21 may receive the request instruction information in a variety of ways, not shown in this illustrative embodiment. For example, the information may be received from memory controller 12 rather than from processing unit $P_1$ thereby eliminating a direct interface between the processing unit and the event correlator. Similarly, processing unit $P_1$ may indicate that a request instruction was being executed by activating certain control lines when a particular op code and address combination were decoded. The implementation of these techniques as well as similar adaptations falls within the scope of this invention.

In this illustrative embodiment, event correlator 21, when a request instruction is detected, utilizes register R2 as a temporary store while it forms the diagnostic data word. The word as shown in register R2 comprises three information items: data, time, and new address. The data which identifies the program name and location in the program of the request instruction is gated directly from register R1 to register R2. In response to a match signal received over line 24, system timer 20 conveys to register R2 the time when processing unit $P_1$ acted upon the request instruction. System timer 20 is a digital clock which indicates processor real-time with great precision, usually down to a microsecond or smaller increment. System timer 20 comprises a well-known oscillator and a synchronous binary counter responsive to the oscillator for measuring processor real-time. One such counter is disclosed in FIG. 4–55 on page 118 of the above-mentioned B. Wels' book. The third item, a new address, is produced by address generator 25, a recycling binary counter, which assigns the word the next address in a succession of addresses identifying locations in a buffer in memory 11 reserved for storing the words. A suitable binary counter is illustrated in FIG. 4–54 on page 117 of the above-mentioned B. Wels' book. The new address is gated into register R2 in response to the match signal received by address generator 25 indicating that a diagnostic data entry is to be made. After receiving the match signal, memory controller 12 inputs over cable 27 the diagnostic data work stored in register R2. The data word is then stored in memory 11 at the assigned ddress.

Address indicator 28 informs memory controller 12 when a portion of the buffer is full. This determination is made by compraing a set of predetermined addresses with the new address in register R2. Each of the predetermined addresses identifies the last word in a different portion of the buffer. Thus, since the addresses of the data words are consecutively assigned, a match indicates that the buffer portion, having the matching address as its last location, is full. Address indicator 28 may beneficially comprise a set of maximum count detectors of the type described in R. D. Smith U.S. Pat. No. 3,673,573, filed Sept. 11, 1970, and issued June 27, 1972. These detectors are placed in parallel with a common input port and with each detector being responsive to one of the set of predetermined addresses for providing an output signal when a match occurs between the new address in register R2 and that one predetermined address. In response to a specific output buffer signal from address indicator 28, the diagnostic information in this buffer portion is retrieved from memory 11 by memory controller 12. This information is conveyed to I/O controller 15 and output via I/O device 13.

Address indicator 28 could also be implemented in a software format, which commands processing unit $P_1$ to cyclically test whether a new diagnostic entry has been made at a given address in memory 11 since the last cyclic test. The timing of this test may be beneficially based upon either a system time value indicated by a diagnostic entry, or other data specified in another field of the entry. The presence of a new diagnostic entry in the given address would indicate that the portion of the buffer up to and including the given address is full and may be output.

By disabling address indicator 28, either by manual or program intervention, the buffer would not output and new diagnostic words would be stored in place of those previously obtained. This technique is useful when it is desired to evaluate stoppages rather than continually monitoring program operation.

Illustrative Event Correlator for a Multiprocessing System

Figure 3:
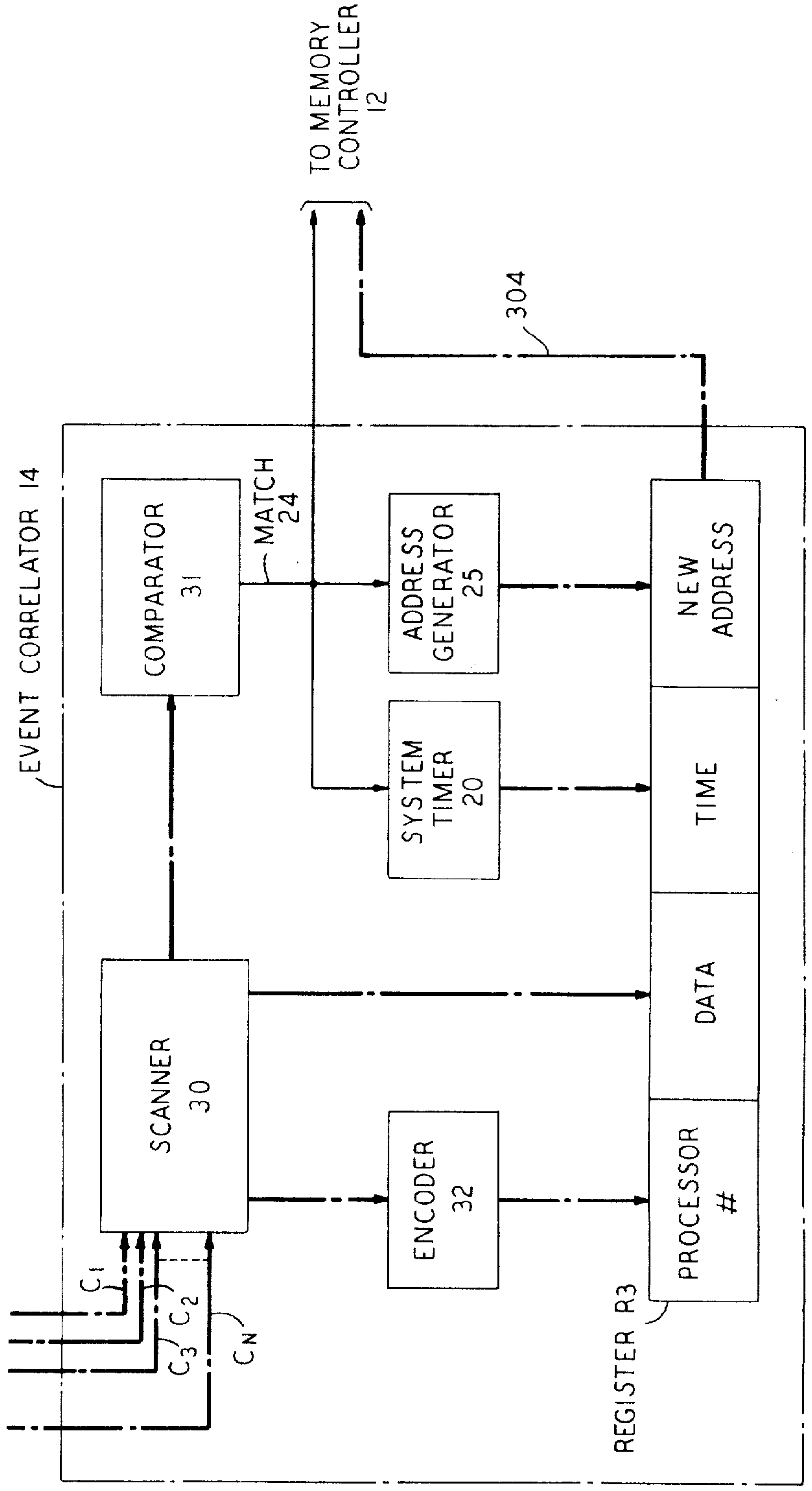
FIG. 3 shows in greater detail the composite parts of the event correlator shown in FIG. 1.

FIG. 3 illustrates in detail an event correlator, as shown in FIG. 1, for use in monitoring a number of processing units. The operation and structure of event correlator 14 of FIG. 3 is substantially identical to that of event correlator 21 of FIG. 2 which monitors a single processing unit. System timer 20 and address generator 25 of FIG. 3 respectively correspond to system timer 20 and address generator 25 of FIG. 2.

Turning now to FIG. 3, all the instructions of a specific type (e.g., store) acted upon by processing units $P_{1-n}$ are conveyed to event correlator 14 via cables $C_{1-n}$. All request instructions are of this type so there is no need to monitor other types of instructions used by processing units $P_{1-n}$. When an instruction is received over one of the cables $C_{1-n}$, scanner 30 autonomously takes the following three actions: the address associated with the incoming instruction is sent to comparator 31, the data in the instruction is transmitted unaltered to register R3, and information indicating on which of the cables $C_{1-n}$ the instruction was received is conveyed to encoder 32. Scanner 30 multiplexes program instructions from the various processing units and conveys specific portions of the multiplexed information to specific destinations, e.g., comparator 31 and register R3. Scanner 30 operates based upon the commutator principle described on pages 285–286 of James Martin's book entitled Telecommunications and the Computer, published in 1969 by Prentice-Hall, Inc.

Encoder 32, in response to the information from scanner 30, transmits in binary form to register R3 a coding which identifies the processing units $P_{1-n}$ which acted upon the instruction. This number is encoded based upon information identifying the cable $C_{1-n}$ which conveyed the instruction to scanner 30. As previously mentioned, the data item is gated directly into register R3 from scanner 30. If the incoming instruction is a request instruction, the data item will specify information useful in analyzing system performance, such as an indication of the program being executed. The processor number and data item are gated into register R3 for all instructions of the specific type that are monitored.

The determination of whether the incoming instruction is a request instruction is made by comparator 31 which compares the address of the instruction received from scanner 30 with a predetermined address which identifies a request instruction. If the addresses do not match, comparator 31 takes no further action. However, a match indicates that the instruction is a request instruction; and comparator 31 informs memory controller 12, system timer 20, and address generator 25 of this event by placing a match signal on line 24. After receiving the match signal, memory controller 12 receives a diagnostic data word from register R3.

The required information which forms the diagnostic data word is, namely, processor number, data, time, and new address. The processor number and data item are input into register R3 while comparator 31 determines whether the instruction is a request instruction. The time when the processor acted upon the request instruction is conveyed from system timer 20 to register R3. System timer 20 outputs the time in response to the match signal it received over line 24. Address generator 25 conveys to register R3 the new address assigned the data word. The new address specifies a location in a buffer reserved for storing diagnostic information. Memory controller 12 retrieves the data word over cable 304 and stores the word at the specified location in memory 11. Event correlator 14 appears to memory controller 12 as a processing unit requiring a store instruction.

In this illustrative example, processing unit $P_1$, in accordance with its stored instructions, checks at each programmed time increment to see if the buffer in memory 11 reserved for storing the diagnostic data words is full. When processing unit $P_1$ ascertains that the buffer is full, it informs memory controller 12 to output the buffer to I/O unit 13 which displays or prints the information.

What is claimed is:

1. In a data processing system comprising a plurality of data processing units for executing instructions, certain of said instructions having a data field, an operation code field and an address field; an auxiliary circuit arrangement for providing information concerning the execution of preselected ones of said certain instructions by said processing units comprising, a register circuit, a comparator circuit, a multiplexer scanner circuit adapted for connection to each of said data processing units for receiving each of said certain instructions as it is being executed by any of said data processing units, and connected to said register circuit for conveying the data field of a received certain instruction to a first distinct portion of said register, and also connected to said comparator circuit for conveying the address field of said received certain instruction to said comparator circuit, an encoder circuit responsive to said scanner circuit and connected to said register circuit for generating processing unit identity information specifying the identity of the processing unit from which said certain instruction is received, and for conveying the generated processing unit identity information to a second distinct portion of said register circuit, said comparator circuit for comparing the address field of said received certain instruction with a predetermined address identifying said preselected ones of said certain instructions and for generating a first signal when a match occurs, a timer circuit connected to said comparator circuit and responsive to said first signal for specifying real-time indicia and also connected to said register circuit for conveying said specified real-time indicia to a third distinct portion of said register circuit, an address generator circuit responsive to said first signal for generating an address, and means responsive to said first signal and controlled by said address generator circuit for storing the contents of said register circuit at the location in a memory identified by said generated address.

* * * * *